April 19, 1960   L. C. BARTLETT ET AL   2,932,855
METHOD FOR FORMING FILM OR SHEETING
Filed Sept. 11, 1956

Lawrence C. Bartlett
Harry J. Krall
INVENTORS

BY
ATTORNEYS

United States Patent Office 2,932,855
Patented Apr. 19, 1960

2,932,855

METHOD FOR FORMING FILM OR SHEETING

Lawrence C. Bartlett, Rochester, and Harry J. Krall, Webster, N.Y., assignors to Eastman Kodak Company, Rochester, N.Y., a corporation of New Jersey Application September 11, 1956, Serial No. 609,273

12 Claims. (Cl. 18—57)

The present invention relates to the manufacture of film or sheeting, and particularly to the production of films or sheets involving the casting of a viscous solution onto a moving support in the form of an extruded ribbon.

In this method the film is formed by extruding a viscous solution of suitable colloidal material, i.e., cellulose acetate, gelatin, etc., from a hopper in the form of a layer or ribbon and onto a moving supporting surface where it is set or cured. In the formation of a self-supporting film or sheet the moving supporting surface may be a polished casting band or wheel from which the layer of solution is stripped after being sufficiently set or cured. In the manufacture of a composite film or sheet, the moving supporting surface may be a previously formed film or sheet onto which another film is deposited and finally cured or dried in situ thereon to form a part of the finished film.

In the manufacture of certain composite films composed of two or more layers of the same or different materials, i.e., film having a coating on one or both sides, film composed of two or more layers of film dope with a coating between and/or on the outer surface of said layers, etc., the coating and/or casting of the separate layers has been done in succession with a partial or complete curing or drying of one layer prior to deposition of a succeeding layer thereon. This procedure has been expensive by reason of the time and equipment involved in the successive application of layers of material one on the other.

The primary object of the present invention has to do with the discovery of a method by means of which a viscous solution can be extruded from a hopper and have a uniformly thin coating applied to one or both surfaces thereof as it is extruded and before it is deposited on a moving supporting surface. This in effect permits the simultaneous casting and coating of a film or sheeting and reduces the time necessary to produce a composite film.

Another object is to provide a method of casting film or sheeting which makes use of this novel procedure to eliminate slugging difficulties on the lips of dope hoppers, a condition which has plagued film casters for years despite many different approaches which have been made to solve this problem.

Another object is to provide a method of casting film or sheeting which makes use of this novel procedure to reduce the time necessary between deposition of the film dope on a casting surface and the stripping of the film from the casting surface.

And yet another object is to provide a new method of making a composite film which makes use of this new dual casting and coating technique.

And still another object is to provide a method of making an improved magnetic sound recording tape which is based on this new casting and coating technique.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
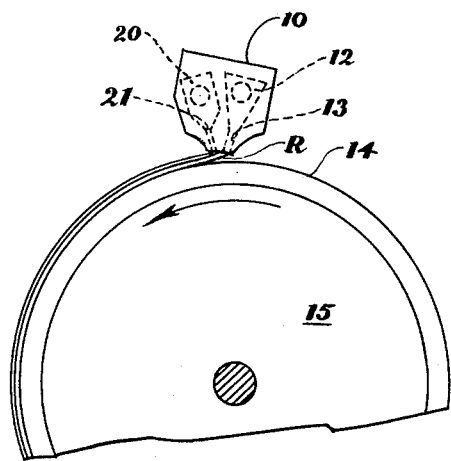
Fig. 1 is a schematic view showing a film casting and coating apparatus by means of which the present invention can be carried out.

In general, the present invention is based on the use of a dual hopper, one compartment of which contains a viscous film-forming substance which is extruded under pressure from a slot and onto a moving supporting surface spaced transversely from the hopper so that the stream of the viscous solution forms an unsupported ribbon bridging the space between the hopper and the supporting surface. The other compartment of the hopper contains a low viscosity coating solution and a discharge slot through which the solution is metered to a bead or pool of the solution formed and maintained against the surface of the stream of viscous solution as it is extruded from the first compartment. The stream of viscous solution moving across and in contact with this bead or pool of low viscosity solution picks up a uniformly thin layer of the solution from the bead on its surface by the well-known bead method of coating. Solutions cast from the extrusion slot are of a viscosity to have sufficient film strength to form a continuous unsupported ribbon between the extrusion slot and the moving supporing surface. The extrusion slot and the supporting surface are separated by not less than .030 inch. The viscosity of the solution that may be cast from the extrusion slot varies somewhat with the film strength and the rheological properties of the material being cast. For example, aqueous solutions of gelatin may be extruded at viscosities as low as 3000 centipoise, while solutions of cellulose acetate in organic solvents have a minimum operating viscosity of 15,000 centipoise.

The coating solution which is to be applied to the surface of the extruded ribbon issuing from the extrusion slot may be a solution or dispersion of any material, the viscosity of which is low enough so that it can be coated by the well-known bead method of coating. The bead method of coating requires that a bead or pool of solution to be coated be held in contact with the surface to be coated so that when the surface moves across and in contact with the bead of solution, it picks up a uniformly thin layer of the solution in the bead by what is known as bead action, or stating it another way, by surface tension forces between the surface to be coated and the bead of solution. In order for this bead method of coating to work, the solution in the bead must be liquid, or readily flowable, to permit the moving surface to pick up a uniformly thin coating therefrom. If the solution fed into the bead is too viscous, then the surface moving across and in contact therewith, instead of picking up a uniformly thin coating therefrom, will pick the solution up in streams which will vary in thickness and which will repeatedly form and snap apart or break up as the surface tension of the solution in the bead overcomes that between the solution and the surface being coated from the bead. Some type of mechanical coating aid is usually employed to hold the bead of solution in contact with the surface being coated therefrom, and this may be a stationary surface adjacent the bead, i.e., the lip or lips of the hopper for the coating solution, onto which the bead of solution hangs by virtue of surface tension forces. In the present method the bead of coating solution is formed and maintained in contact with the extruded ribbon of viscous casting solution and a thin uniform coating of the low viscosity coating solution is picked up on the surface of the extruded ribbon to be transferred to the moving supporting surface therewith.

Referring now to the drawings, an apparatus for carrying out our novel method of simultaneously casting a film and coating one or both surfaces thereof comprises a dual hopper 10 which is shown as the combination of two conventional extrusion slot hoppers, although this is not necessary. The high viscosity dope from which the film is cast should be extruded under pressure, but the low viscosity coating solution need not be extruded under pressure since only a metering action is required to feed this solution to a bead or pool at a constant known rate and any type of feed hopper, i.e., slide hopper, capillary tube, etc., can be used to supply the coating solution as will be apparent from the following description.

The high viscosity film dope 11 which is to be cast is fed into a compartment 12 under pressure so that it is extruded under pressure from a narrow extrusion slot 13 in the form of a ribbon R and onto a supporting surface 14 continuously moving across the exit end of the hopper. This moving supporting surface 14 may be either of two things, depending upon the final product to be obtained. If the dope being cast is to constitute a separate self-supporting film or sheet, then the moving supporting surface 14 will be a polished casting surface, a chromium plated wheel 15, as shown in Fig. 1, or an endless band, onto which the stream of film dope is deposited to be stripped therefrom after the layer of dope has been sufficiently cured, as is well known in the art. The final thickness of the layer of dope deposited on the supporting surface 14 will not ordinarily be equal to the width of the extrusion slot 13, but will be thinner than this dimension because of the pull-down action of the supporting surface 14 on the ribbon of dope. For example, if the supporting surface 14 is moving across the end of the hopper at a rate faster than the ribbon is being extruded from the hopper, then the ribbon R of dope will be stretched out and thinned down before it is laid on the supporting surface. Thus by changing the speed of the supporting surface relative to the rate at which the dope is extruded from its hopper, a certain amount of control of the final thickness of the laid down layer of dope can be achieved.

If it is desired to produce a composite film using the present invention, then the supporting surface 14 may be a previously formed film or sheet onto which the layer of dope being extruded is deposited and cured in situ thereon to finally become a part of said film or sheet. In such a case the preformed film or sheet would be supported on a wheel or endless band opposite the hopper slot so as to form a smooth rigid surface onto which the layer of dope is laid down.

Figure 2:
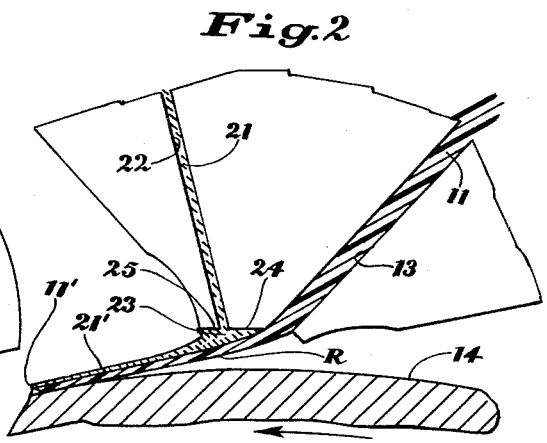
Fig. 2 is an enlarged sectional detail showing one embodiment of the apparatus intended for casting a film or sheeting and coating the surface thereof which is not engaged by the supporting surface onto which the dope is deposited.

According to the present invention, the exit end of the extrusion slot 13 is spaced transversely from the moving supporting surface 14 by at least .030 inch, although we have found a distance of .060 inch to be very satisfactory for the manufacture of certain products, examples of which are given below. Such a spacing between the supporting surface of the hopper results in the unsupported ribbon R of film dope in bridging relation between the hopper and the supporting surface and to the surface of which ribbon we apply a coating of low viscosity solution by the bead method of coating. Such spacing also requires that the viscosity of the film dope used be such that the dope have a film strength which will form a continuous ribbon across the space between the hopper and the supporting surface as mentioned above. In the second compartment 20 of the hopper there is a supply of low viscosity coating solution 21 which is adapted to be coated onto the surface of the ribbon R of extruded dope. If the coating solution is to be applied to the surface of ribbon R which does not ultimately engage the supporting surface 14, as shown in Fig. 2, then a quantity thereof is metered through discharge slot 22 to a bead or pool 23 of this solution that is formed and maintained in contact with the top surface of the ribbon R. As shown in Fig. 2, this metering slot 22 is inclined toward the extrusion slot 13 and its exit end is spaced from and connected to one edge of the exit end of the extrusion slot by a wall or surface 24 which can be considered as a lip common to both discharge slots. The other lip 25 of the metering slot 22 extends substantially at right angles to said slot. The bead 23 of the low viscosity coating solution 21 issuing from the metering slot is formed and maintained in contact with the top surface of the ribbon R by surface tension forces between the solution and the wall or surface 24 and the lip 25 of the metering slot. Then since the ribbon R moves across and in contact with the bead 23 as it is extruded from slot 13, it picks up a uniformly thin layer 21' of the coating solution 21 on its top surface by a bead action prior to the time it is deposited on the supporting surface. The bead method of coating per se has been extensively used in the coating art because it provides a means of laying down a uniformly thin coating onto a surface, the thinness and surface uniformity of which emanates from the bead action, or the surface tension forces between the solution in the bead and the surface being coated therefrom, and no physical doctor or other part of the coating machine need be close enough to the surface being coated to possibly injure the same by reason of the surface being coated physically engaging any part of the apparatus due to fluctuations in thickness of the surface being coated. For the bead method of coating to operate, the solution being so coated must be a liquid of sufficiently low viscosity to allow this bead action. Another advantage of the bead method of coating is that for a given speed of the surface being coated and a given viscosity of solution being coated, the thickness of the coating picked up by the surface being coated will vary in direct proportion to the rate at which the coating solution is fed into the bead within certain limits. Accordingly, some means such as a constant rate pump, not shown, should be provided for feeding the coating solution to the bead at a constant rate commensurate with the rate at which it is taken from the bead by the ribbon of dope.

Figure 3:
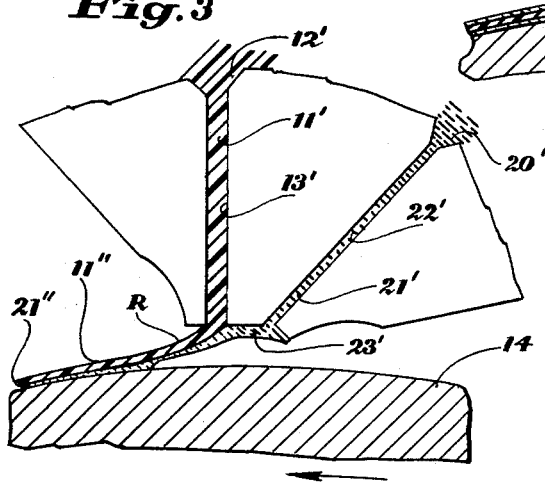
Fig. 3 is a view similar to Fig. 2 but showing an embodiment wherein the opposite side of the cast film dope is coated as it is extruded.

As shown in Fig. 3, the coating solution 21 can be applied to the other side of the extruded ribbon R of dope so that the coating 21' directly engages the supporting surface 14 and the layer 11" of dope is spaced from the supporting surface thereby. To accomplish this, it is merely necessary to place the compartment 20' for the coating solution on the other side of the compartment 12' for the film dope so that the bead 23' of coating solution is formed and maintained against the other surface of the ribbon of dope R. As will be seen by comparing Figs. 2 and 3, it may be desirable to change the position of the extrusion slot 13' relative to the supporting surface 14 to ensure the best casting conditions, but the relative positions of the extrusion and metering slots with each other and the face of the supporting surface may be varied over wide limits depending upon the particular application to which the apparatus is put. Since the corresponding parts of the apparatus in the embodiments of Figs. 2 and 3 correspond in every way except for relative location, the parts of Fig. 3 are referred to by the same reference character as they are in Fig. 2 except that a prime (') suffix has been added to indicate that this is a different embodiment of the invention.

Figure 4:
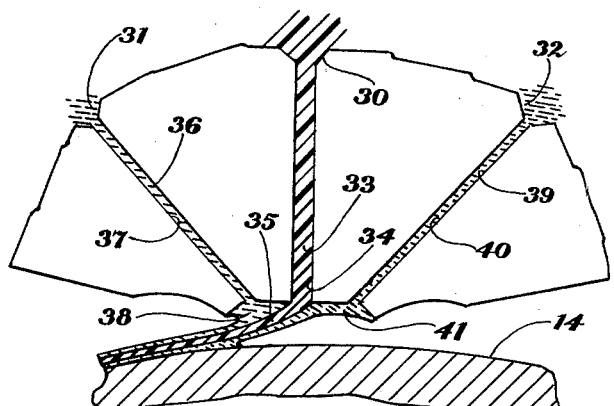
Fig. 4 is an enlarged sectional detail showing an embodiment of an apparatus by means of which both surfaces of an extruded film dope can be coated simultaneously as it is being extruded and prior to its deposition upon a moving supporting surface.

In Fig. 4 we have shown an apparatus by means of which a layer of dope can be cast and have both surfaces thereof coated with a low viscosity solution simultaneously and before the composite film is deposited on a supporting surface. In this embodiment of the invention the hopper comprises three compartments, one designated as 30 for the high viscosity film dope, another designated as 31 for a low viscosity coating solution, and a third designated as 32 for a second coating solution. A stream of film dope 33 is extruded under pressure from a discharge slot 34 to form a continuous unsupported ribbon 35 in bridging relation between the exit end of the discharge slot and the supporting surface 14 moving in the direction of the arrow. A metered amount of the first coating solution 36 is fed through a discharge slot 37 to a bead 38 of the soluion maintained by surface tension forces between the coating solution and the lips of the hopper against the top surface of the ribbon of film dope. A metered amount of the second coating solution 39 is fed from a discharge slot 40 into a bead 41 of that solution maintained by surface tension forces between that coating solution and the lips of the hopper against the bottom surface of the ribbon of film dope as it is extruded from the discharge slot 34. Thus both surfaces of the ribbon of film dope in passing to the supporting surface 14 move across and in contact with the beads 38 and 41 of solutions 36 and 39, respectively, and pick up a uniformly thin layer of each of the solutions by a bead action prior to being deposited on the supporting surface. The thickness of the layers of coatings picked up by the surface of the ribbon of film dope will vary in direct proportion to the rate at which each of the coating solutions are fed into their respective beads 38 and 41. It will thus be seen that this procedure makes it possible to produce a composite film, i.e., a film support coated on both surfaces with a uniformly thin layer of the same or different coating solution, in one operation instead of three successive operations as required by conventional techniques.

This dual casting and coating technique has proven very useful in many applications, including the casting of film or sheeting and the manufacture of composite films of specific types. Examples of some of these applications which are new inventions themselves will now be given.

*Example 1*

In the normal casting of film dope from an orifice onto a polished casting surface, occasional trouble results from partially dried dope adhering to the front edge (that from which the casting surface leaves) of the discharge slot. This results in small "slugs" adhering to the hopper lip which create drag lines on the surface of the dope stream which are still noticeable in the cured film support or sheeting. By using equipment as illustrated in Fig. 2, it is possible to cast a high viscosity film dope from discharge slot 13, and use a low viscosity solution of the dope as the coating solution discharged from slot 22 to prevent the formation of "slugs" on the front edge of the discharge slot 13.

With reference to Fig. 2 a film dope composed of 100 parts of cellulose acetate of 43.4% acetyl and 15 parts triphenyl phosphate dissolved in 500 parts of solvent composed of 410 parts of methylene chloride, 40 parts cyclohexane and 50 parts methyl alcohol, was extruded from discharge slot 13 onto a polished casting surface 14 moving continuously across the end of the hopper. The viscosity of this dope was approximately 60,000 centipoise and the hopper was located approximately .060 inch above the casting surface. As soon as a continuous ribbon R of this dope was formed, a solution was metered through metering slot 22 to a bead 23 of this solution in suitable quantity to give a final cured thickness of .0001 inch from the following composition: 1 part cellulose acetate of 39.5% acetyl (no plasticizer) dissolved in 10 parts of a solvent mixture comprised of 90% methylene chloride, 10% methyl alcohol. The viscosity of this solution was 200 centipoise.

In normal operation, the solution supplied from slot 22 would not form a continuous ribbon to the casting surface but would give a series of streams if it were not for the high viscosity film dope extruded from slot 13 which was of sufficient film-forming strength to yield a continuous ribbon from the exit end of the discharge slot 13 to the casting surface. The high viscosity film dope, however, in moving across and in contact with the bead of low viscosity solution picks up a uniformly thin coating of low viscosity solution on its surface before it is deposited on the casting surface. This bead 23 of the low viscosity solution completely covers the front edge of the discharge slot 13 and by excluding air therefrom prevents the formation of "slugs" of dried dope on this edge of the discharge slot. This low viscosity solution (200 cps.) may also be applied in the manner shown in Fig. 3 to the other surface of the ribbon of dope should it be so desired.

*Example 2*

In equipment illustrated in Fig. 2 a solution comprised of 100 parts of cellulose acetate of 39.5% acetyl with 15 parts of triphenyl phosphate and 15 parts of methoxyethylphthalate dissolved in 255 parts of acetone and 45 parts of methyl alcohol was extruded from discharge slot 13 onto a suitable polished casting surface 14. The viscosity of this solution was 25,500 cps. at 120° F. Simultaneously a low viscosity solution comprised of 100 parts of cellulose acetate of 39.5% acetyl with 3 parts of blue dye, such as that commercially available under the tradename "Eastone BGF," dissolved in 5000 parts of acetone was supplied to metering slot 22. The viscosity of this coating solution was 3.1 centipoise at 80° F.

The resulting film was an intensely colored blue plastic sheeting material which could be produced in one operation. The process allows the production of colored sheeting without the necessity of mixing color in the large quantity of high viscosity material supplied to the discharge slot 13. The dye solution may also be applied to the other surface of the cast sheeting by using the embodiment of Fig. 3.

*Example 3*

In the production of film support and high quality sheeting from a cellulose ester material by the casting process, the speed at which the film-forming equipment can operate is limited by the time required to evaporate enough solvent from the dope so that the formed sheeting can be stripped from the casting surface. In order to decrease the time that the film dope must be supported on the casting surface, equipment of the type shown in Fig. 3 was used to extrude from discharge slot 13' a film dope comprised of 100 parts cellulose ester containing 29.3% acetyl and 17.1% butyryl and 8 parts triphenyl phosphate dissolved in 300 parts of methylene chloride and 30 parts of methyl alcohol. The viscosity of this dope was approximately 45,000 cps. Simultaneously a solvent mixture comprised of 50 parts of methylene chloride and 50 parts of cyclohexane was metered through discharge slot 22' to bead 23'. The ribbon of dope moving across and in contact with the bead of solution picked up a uniformly thin layer of solvent which was applied between the film and the casting surface 14. Since the solution supplied through metering slot 22' was an active gelling agent for the film dope, it was possible to strip the partially cured film from the casting surface at speeds approximately three times that which could be accomplished without the use of the gelling agent supplied from the discharge slot 22'. This solvent mixture had a viscosity of 1.5 centipoise at 80° F.

*Example 4*

Using apparatus as illustrated in Fig. 3, a 450 cps. viscosity solution of 100 parts of cellulose acetate butyrate of 29.3% acetyl, 17.1% butyryl with 8 parts triphenyl phosphate and 15 parts titanium dioxide, dissolved in 675 parts of methylene dichloride, 225 parts of cyclohexane and 100 parts of n-butyl alcohol was metered through discharge slot 22' and was coated by a bead action onto the same viscous solution as given in Example 3 extruded from discharge slot 13'. A composite sheet was obtained with the desired whiteness and opacity composed of a cured pigmented layer .001 inch thick and a transparent layer .0072 inch thick.

*Example 5*

A very opaque sheeting as described by U.S. Patent 2,694,662, and particularly useful as playing card stock, can be duplicated by using this dual casting and coating technique.

A composition comprised of 100 parts of cellulose acetate butyrate with 29.2% acetyl, 17.1% butyryl, 8 parts of triphenyl phosphate and 8 parts of finely ground titanium dioxide dissolved in 230 parts of ethylene dichloride, 65 parts of cyclohexane and 35 parts of n-butyl alcohol was cast in the normal manner to a thickness of .005 inch. On stripping and further curing, this sheet formed the casting or supporting surface 14 for the dual hopper casting and coating technique.

The dual hopper application consisted of a composite layer applied to the previously formed film just described. A film-forming material comparable to the above and having a viscosity of 25,000 cps. at 120° F. was extruded from discharge slot 13'. A solution of pigmented material containing 100 parts of cellulose acetate butyrate of like composition to that above containing 3 parts carbon black properly dispersed in a solvent mixture of 950 parts of ethylene dichloride and 50 parts of n-butyl alcohol and having a viscosity of 400 cps. at 100° F. was metered through slot 22'. The composite layer applied to the previously formed and cured film formed a sheeting of improved physical properties and high optical density. The resulting composite film was comprised of a sandwiched sheeting with .005 inch layers of white pigmented material on both sides of a carbon pigmented layer of approximately .0001 inch. The optical density of this sheeting was greater than 3.5 and was particularly satisfactory for use in plastic playing cards.

*Example 6*

It is possible to coat aqueous solutions in the same manner as described in the previous examples of organic solvent solutions. For example, a solution of 8% gelatin in water with a viscosity of 15 cps. at 100° F. was metered from slot 22 and a solution of 28% gelatin in water with the viscosity of 3000 cps. at 100° F. was extruded from discharge slot 13 onto a film support used as the supporting surface in the embodiment of apparatus shown in Fig. 2. The 3000 cps. viscosity gelatin has sufficient film strength that it can be cast in a regular extruded fashion. The film strength of this solution is sufficient to form a continuous ribbon between the hopper and the supporting surface when the two are separated by more than .030 inch. The low viscosity 15 cps. gelatin from metering slot 22 formed a bead at the extrusion slot and a coating thereof was carried therefrom on the surface of the extruded layer to be carried thereby onto the supporting surface. By pulling down the extruded stream of high viscosity gelatin, it is possible also to reduce the coated thickness of the low viscosity gelatin applied. By this method it is possible to produce a micro-thin layer of gelatin in combination with a thicker gelatin layer. The gelatin layers may be of different composition or contain different dyes, light-sensitive silver and other additives to produce various effects. The same materials may also be used in the embodiment shown in Fig. 3.

Likewise two low viscosity solutions can be coated onto the film supporting surface using metering slots 37 and 40 with a viscous film-forming gelatin solution extruded from discharge slot 34 using an apparatus of the type shown in the Fig. 4 embodiment.

*Example 7*

Using a dual hopper as illustrated in Fig. 2, a solution comprised of 100 parts of cellulose acetate of 39.5% acetyl with 15 parts of triphenyl phosphate and 15 parts of methoxyethylphthalate dissolved in 255 parts of acetone and 45 parts of methyl alcohol was extruded from discharge slot 13 onto a suitable film supporting surface 14. The viscosity of this solution was 25,500 cps. at 120° F. At the same time, a solution comprised of 100 parts cellulose acetate of 16.1% acetyl dissolved in 2100 parts of water and 900 parts of acetone was metered through metering slot 22. The viscosity of this solution was 220 cps. The resulting film was composed of .005 inch thick layer of water-insoluble acetate with an overlayer .0005 inch thick of water-soluble cellulose acetate.

*Example 8*

Our method of dual casting and coating is particularly adapted to the production of magnetic sound tape which comprises a flexible cellulose ester film support having an oxide layer on one surface thereof. The conventional method of making such a magnetic tape has involved two separate steps, namely, the formation of the film support and then the coating of the same with magnetic oxide and some difficulty has been encountered in obtaining a smooth surface on the oxide layer, a condition which is highly desirable in such sound tapes in order to permit them to be passed through the recording heads of magnetic sound recorders without the oxide coating being rubbed off by the recording head of the recorder and, consequently, fouling the device.

Using equipment illustrated in Fig. 3, 100 parts of 43.4% acetyl cellulose acetate and 15 parts of triphenyl phosphate dissolved in 455 parts of methylene chloride and 55 parts of methyl alcohol having a viscosity of 45,000 cps. at 80° F. were extruded from discharge slot 13' and deposited onto a suitable polished casting surface 14. A dispersion, magnetic iron oxide in a binder solution of plasticized vinyl chloride-acetate resin, containing 24.7% iron oxide, 5.9% vinyl chloride-acetate, 1.8% Flexricin P-8, 0.6% Aerosol OT, 37.5% acetone, and 29.4% methylene chloride was supplied through metering slot 22' forming a bead coating on the film-forming cellulose acetate layer. The viscosity of the dispersion, measured with a Brookfield Viscometer, was approximately 3500 cps. We have reason to believe that oxide dispersions having a viscosity as high as 10,000 cps. will coat satisfactorily out of a bead.

The layers of the composite coating formed at discharge slot 13' and bead 23' can be controlled in thickness by the material supply speed and the linear speed of the casting surface. In production of magnetic tape material illustrated by this example, the composite layer of cellulose acetate support 1.5 mils thick and a magnetic oxide layer 0.5 mil thick was produced. Variations in the dispersion formulation are possible as long as a solvent composition is selected which will cure adequately through the support layer to allow stripping at the end of the curing cycle on a casting surface.

The Fig. 3 embodiment of apparatus is particularly desirable in the manufacture of magnetic tape for the reason that the magnetic oxide coating will engage the polished surface of the casting surface 14 and when it is cured, will mirror this surface and a very smooth oxide coating will result. By reason of the fact that uniformly thin coatings can be applied by the bead coating technique, this procedure for the manufacture of magnetic tape is very desirable since the oxide coatings in such tapes must be quite thin and of uniform thickness throughout. Furthermore, this procedure, in addition to producing a magnetic tape which has unusually high quality, speeds up the production of such tapes and results in a lower cost of production, by reason of the fact that the tape is produced in one operation rather than requiring two successive operations.

From the above description it will be appreciated that the present dual casting and coating technique offers several important advantages which cannot be realized by the present casting and coating practices:

(1) This procedure makes possible the production of a composite tape in a single casting and coating operation instead of requiring several successive operations.

(2) This procedure makes possible the coating of a thin layer of low viscosity solution upon a large moving casting surface such as a casting wheel. To apply a thin film to a casting surface by any present practice would require a scraper or levelling device installed very close to the casting surface. The precision and exact tolerance requirement makes such devices impractical. The substantial spacing allowed between the dual hopper and the casting surface in the practice of the present dual technique minimizes the importance of space requirements.

(3) The precision of the coating is governed by the metering slots of the hopper which are easily acquired and maintained.

(4) The spacing allowed between the hopper and casting surface eliminates the effects of frictional wear encountered with other methods.

(5) Since the dual hopper is used to extrude the viscous layer, it incorporates all the advantages of extrusion casting. An important advantage of extrusion casting is that there is seldom a speed limitation as is encountered with other casting devices using low viscosity materials for which there is a certain cutoff efficiency for limiting speed.

(6) Application of the coating layer to the casting surface until sensibly dry, as is characteristic of the Fig. 3 embodiment, prevents the inclusion of foreign particles (dust, lint, etc.) in the coating. This is an extremely important consideration in the oxide layer of magnetic tapes and extreme care has heretofore been required to minimize such inclusions in the oxide layer when using conventional methods of coating.

(7) Another advantage particularly applicable to the manufacture of magnetic tapes is that the application of the oxide layer to the smooth chromium casting surface produces a smooth oxide surface having no abrupt surface protrusions which result in sound irregularities as in conventional magnetic oxide coatings.

(8) Other advantages particularly characteristic of the method so far as the production of magnetic tape is concerned, include a smooth oxide surface which minimizes magnetic head wear as well as reduces the dusting off of oxide particles from the tape surface, and the simultaneous extrusion of the support and coating of the oxide layer thereon integrally binds the two layers thereby eliminating the need for an adhesive interlayer.

While we have shown and described certain specific embodiments of our invention, we are fully aware that many modifications thereof are possible. For example, as pointed out above, the invention is not limited to the use of a hopper in which the compartments for the different casting and coating solutions are within one and the same casting as illustrated. Two separate hoppers of different forms could be used, so long as the dope hopper is one of the extrusion type, and the discharge end of the metering slot of the hopper for the coating solution can be arranged to form and maintain a bead of its coating solution against one surface of the extruded ribbon of dope at a point spaced from the moving supporting surface so that the surface of the ribbon is coated by a bead action prior to its being laid down on the supporting surface.

Having thus described our invention, what we claim as new and desire to secure by Letters Patent of the United States is:

1. The method of casting a composite film onto the surface of a continuously moving support comprising the steps of continuously extruding a stream of a solution of a colloidal material from a stationary hopper onto said moving support spaced transversely from said hopper by a distance such that a layer of dope issuing from said hopper forms a self-sustaining and unsupported ribbon bridging the distance between the hopper and said moving support, said colloidal solution having a viscosity high enough to possess a film strength sufficient to form a continuous unsupported ribbon of solution in bridging relation between the hopper and said support, forming a bead of coating solution against one surface of said unsupported ribbon of colloidal solution in spaced relation with said support across and in contact with which bead said ribbon of colloidal solution moves in passing to said support, said coating solution having a viscosity sufficiently low to permit said ribbon to pick up a layer thereof on its surface by a bead action as it moves thereacross, and continuously feeding a quantity of said coating solution to said bead commensurate with the rate at which it is taken from said bead on the surface of said ribbon to substantially maintain said bead of a given size.

2. A method of casting a composite film onto the surface of a continuously moving support according to claim 1, characterized by forming and maintaining a second bead of coating solution having a viscosity sufficiently low to permit said ribbon to pick up a layer thereof on its surface by a bead action as it moves thereacross against the other surface of said unsupported ribbon of colloidal solution across and in contact with which bead said ribbon of colloidal solution moves in passing to said support, whereby both surfaces of said ribbon have a layer of coating solution deposited thereon by a bead action prior to being deposited onto said support.

3. The method of casting a composite film onto the surface of a continuously moving support according to claim 1 in which said solution of colloidal material comprises a solution of a cellulose organic acid ester having a minimum viscosity of 15,000 centipoise and the coating solution has a maximum viscosity of 10,000 centipoise.

4. The method of casting a composite film onto the surface of a continuously moving support according to claim 1 in which said solution of colloidal material comprises an aqueous solution of gelatin with a minimum viscosity of 3000 centipoise at 100° F. and said coating solution comprises an aqueous solution of gelatin with a maximum viscosity of 15 centipoise at 100° F.

5. The method of casting a composite film onto the surface of a continuously moving support according to claim 1 characterized by the fact that the moving support is a polished casting surface from which the composite film is adapted to be stripped after curing.

6. The method of casting a composite film onto the surface of a continuously moving support according to claim 1 characterized by the fact that the moving support is a web of flexible material to which the composite film is adapted to permanently adhere and become a part thereof.

7. The method of forming a flexible support of a cellulose organic acid ester comprising continuously extruding a solution of said cellulose organic acid ester in volatile solvents and having a viscosity in excess of 15,000 centipoise from a slot in a stationary hopper and onto a polished casting surface moving past and spaced transversely from the discharge end of said slot in the form of a continuous ribbon extending between the hopper and said casting surface, forming a bead of said cellulose organic acid ester solution reduced to a viscosity of less than 3000 centipoises against the side of said ribbon remote from the casting surface and against and in covering relation with the lip of the hopper slot adjacent thereto to prevent the formation of slugs on this hopper lip and across and in contact with which said ribbon moves in passing to said casting surface to pick up a layer thereof, and continuously feeding a quantity of said low viscosity solution to said bead commensurate with the rate at which it is taken from said bead on the surface of said ribbon to maintain said bead of a size to cover said lip of the hopper slot and prevent the formation of slugs thereon.

8. The method of forming a flexible film support of a cellulose organic acid ester comprising continuously extruding a solution of said cellulose organic acid ester in volatile solvents and having a viscosity in excess of 15,000 centipoise from a stationary hopper in the form of a ribbon onto a moving polished casting surface spaced transversely from said hopper, forming against that surface of said ribbon of cellulose organic acid ester which is adapted to engage said casting surface as it leaves the hopper, a bead of a solution of a composition which will gel said cellulose organic acid ester solution when brought into contact therewith and across and in contact with which bead said ribbon moves in passing to said casting surface; said solution having a viscosity sufficiently low to permit said ribbon to pick up a layer thereof on its surface by a bead action as it moves thereacross and which layer is interposed between the casting surface and the ribbon of cellulose organic acid ester and serves to gel the surface of the ribbon to facilitate the stripping thereof from said casting surface; and continuously feeding a quantity of said gelling solution to said bead commensurate with the rate at which it is taken from said bead on the surface of said ribbon to maintain said bead of a given size.

9. The method of forming a magnetic tape comprising the steps of continuously extruding a film dope consisting of a solution of a cellulose organic acid ester in volatile solvents having a minimum viscosity of 15,000 centipoise from a stationary hopper in the form of an unsupported ribbon and onto a polished casting surface spaced transversely from the hopper and continuously moving relative thereto, forming a bead of a magnetic oxide dispersion having a viscosity of 10,000 centipoise or less against that surface of the extruded ribbon of film dope adapted to engage the casting surface and at a point spaced from said casting surface, whereby said ribbon of film dope moves across and in contact with said bead of magnetic oxide dispersion to pick up a uniform, thin coating thereof by bead action and which coating engages the casting surface when the ribbon of dope is laid on the wheel; continually feeding a quantity of said magnetic oxide dispersion to said bead commensurate with the rate at which it is coated onto said ribbon of dope to maintain the size of the head substantially constant; and stripping the combined film support and magnetic oxide coating from the casting surface when the layers are sufficiently set to be self-supporting and to allow such stripping.

10. The method of forming a composite sheeting consisting of layers of white pigmented material on both sides of a carbon pigmented layer comprising the steps of continuously extruding a film dope consisting of a solution of cellulose organic acid ester in volatile solvents containing finely ground titanium dioxide having a minimum viscosity of 15,000 centipoise from a stationary hopper in the form of an unsupported ribbon and onto the surface of a film support composed of the same material continuously moving relative to hopper and spaced transversely therefrom; forming a bead of a solution of cellulose organic acid ester in volatile solvents with carbon black dispersed therein and having a viscosity of 3500 centipoise or less against that surface of the extruded ribbon adapted to engage the film support and at a point spaced from said film support whereby said ribbon of film dope moves across and in contact with said bead of solution to pick up a uniformly thin coating thereof by bead action and which coating engages the moving film support; continuously feeding a quantity of said low viscosity solution to said bead commensurate with the rate at which it is coated therefrom onto said ribbon of film dope to maintain the size of said bead substantially constant; and curing said deposited layers in situ on said film support.

11. The method of making a magnetic tape consisting of a flexible support made from a cellulose organic acid ester having a magnetic oxide coating thereon and comprising continuously extruding a layer of cellulose organic acid ester solution from a hopper to a casting surface spaced therefrom and which layer is self-sustaining and unsupported between the hopper and said casting surface, coating one surface of said unsupported portion of said extruded layer while wet with a layer of a magnetic oxide dispersion, depositing said joined layers onto a polished casting surface with the magnetic oxide layer adjacent the polished surface, and stripping said joined layers from said casting surface when they are sufficiently cured.

12. The method of making a magnetic tape consisting of a flexible support made from a cellulose organic acid ester having a magnetic oxide coating thereon and comprising continuously extruding a layer of a cellulose organic acid ester solution from a hopper toward a polished casting surface which is moving relative to said hopper; continuously feeding a magnetic oxide dispersion into a bead of the dispersion maintained between a portion of the hopper and the surface of the extruded ester layer adapted to face said casting surface, whereby the surface of the ester layer moves across said bead and in surface contact therewith and is coated with a thin layer of the dispersion by a bead action, continuously feeding a quantity of said magnetic oxide dispersion into said bead at the same rate as it is being taken away by the layer of ester solution, depositing the combined layers onto said casting surface with the magnetic oxide layer engaging the polished surface, and stripping said joined layers from said casting surface when they are sufficiently cured.

References Cited in the file of this patent
UNITED STATES PATENTS

| | | |
|---|---|---|
| 2,587,594 | Chavannes et al. | Mar. 4, 1952 |
| 2,681,294 | Beguin | June 18, 1954 |
| 2,761,791 | Russell | Sept. 4, 1956 |